(12) United States Patent
Kim et al.

(10) Patent No.: US 12,182,253 B2
(45) Date of Patent: Dec. 31, 2024

(54) METHOD FOR PROVIDING SERVICE FOR SECURITY OF WEB-BROWSER-BASED CONTENT

(71) Applicant: DRM INSIDE CO., LTD., Seoul (KR)

(72) Inventors: Tae Hyun Kim, Seoul (KR); Heonseob Lee, Seongnam (KR)

(73) Assignee: DRM INSIDE CO., LTD., Seoul (KR)

( * ) Notice: Subject to any disclaimer, the term of this patent is extended or adjusted under 35 U.S.C. 154(b) by 0 days.

(21) Appl. No.: 17/792,393

(22) PCT Filed: Oct. 28, 2020

(86) PCT No.: PCT/KR2020/014838
§ 371 (c)(1),
(2) Date: Jul. 12, 2022

(87) PCT Pub. No.: WO2022/080547
PCT Pub. Date: Apr. 21, 2022

(65) Prior Publication Data
US 2024/0176866 A1    May 30, 2024

(30) Foreign Application Priority Data
Oct. 15, 2020    (KR) .......................... 10-2020-0133766

(51) Int. Cl.
*G06F 21/45*    (2013.01)
(52) U.S. Cl.
CPC .................................. *G06F 21/45* (2013.01)

(58) Field of Classification Search
CPC ........ G06F 21/45; G06F 21/128; G06F 21/30; G06F 21/60
See application file for complete search history.

(56) References Cited

U.S. PATENT DOCUMENTS

| | | | | |
|---|---|---|---|---|
| 9,015,857 B2* | 4/2015 | Sprague | .............. | H04L 63/0428 726/28 |
| 9,350,714 B2* | 5/2016 | Freeman | .............. | H04L 67/1097 |
| 10,084,794 B2* | 9/2018 | Goldfarb | .............. | G06F 21/6218 |
| 10,255,445 B1* | 4/2019 | Brinskelle | .............. | G06F 21/606 |
| 10,885,212 B2* | 1/2021 | Teal | .................... | G06F 12/0813 |
| 11,277,416 B2* | 3/2022 | Ray | ........................ | H04L 63/123 |
| 11,403,373 B2* | 8/2022 | Fleck | ...................... | G06F 21/60 |
| 11,870,769 B2* | 1/2024 | Bester | .................. | H04L 9/0894 |

* cited by examiner

*Primary Examiner* — Hosuk Song
(74) *Attorney, Agent, or Firm* — Lucem, PC; Heedong Chae

(57) ABSTRACT

The present disclosure relates to a method for providing a service for security of a web-browser-based content which increases security of an original content by inserting garbage characters into a text constituting an HTML-based original content, which can be opened through a web browser, to secure the original content, and by enabling only authenticated functions to be executed when calling functions for removing the garbage characters and performing functions related to the original content. The present disclosure, without installing a specific program linked to the web browser, can easily prevent a user who does not have the right to open an original content on a web browser from abnormally accessing the original content by constructing a certain function which is not authenticated. Thereby a copyrighted product infringement for a web browser-based original content can be prevented.

10 Claims, 10 Drawing Sheets

```
<p class="space">...</p>
<h1 class="txt2 dm tcenter"> ROBI THAT TAKES CARE OF CHILDREN </h1>
<p class="space">...</p>
<div class="wp110 icenter">...</div>
<p class="txt bl">...</p>
<h2 class="txt bb" id="sigil_toc_id_1">...</h2>
<p class="txt bl">...</p>
<p class="txt bl">"97, 98, 99, 100"</p>
<p class="txt bl"> ==$0
```

"GLORIA QUIETLY LOOKED AROUND WITH HER EYES OPEN. BUZZING SOUND OF INSPECTS COMES FROM A QUIET GARDEN. 'WHERE DID IT HIDE, ROBI' GLORIA SEARCHED THE FOREST AND BEHIND TREES. BUT ROBI WASN'T THERE. 'IT MUST HIDE INSIDE THE HOUSE. YOU PROMISED NOT TO HIDE INSIDE THE HOUSE. 'GLORIA GOD CROSS AND SHORTLY GOD HER CHEEKS SWELLED. AND SHE STARTED TO WALK TO A HOUSE WITH A RED ROOF. AT THE MOMENT, A RUSTLE SOUND WAS MADE IN THE GRASS BEHIND. GLORIA LOOKED OVER HER SHOULDERS, AND SOMETHING DEEP-BLACK AND LARGE RAN OUT."

```
</p>
<p class="txt bl">     OH, IT'S ROBI, FOUND IT     </p>
```

FIG.3

CREDENTIAL INFORMATION

```
{
  "client_id":"Evaluation version of Web-x SDK",
  "credentials":{
    "_reserved_":"_reserved_",
    "3e159e5fbc893d147e105cf95577ca2e1ddb8ea4":"f1",
    "ddb99d42ccb57d733fd03b86fe496a1dccfcc7f6":"getText"
  },
  "datetime":"9/3/2020 2:05PM",
  "signature":"499a0278b8bb220e5b4a6e4415aa0a25f0538ff1"
}
```

CUSTOM MODULE WITH CREDENTIAL INFORMATION INSERTED THEREIN

```
var WEB_X_FUNCTION_CREDENTIAL = '{"client_id":"Evaluation version of Web-x
SDK","credentials":{"_reserved_":"_reserved_","3e159e5fbc893d147e105cf95577
ca2e1ddb8ea4":"f1","ddb99d42ccb57d733fd03b86fe496a1dccfcc7f6":"getText"}
,"datetime":"9/3/2020
2:05PM","signature":"499a0278b8bb220e5b4a6e4415aa0a25f0538ff1"}';

var getText2 = function(position) {
    let t2 = document.body.children[position];
    return t2.textContent;
};
```

FIG.6

```
>WEB_X_FUNCTION_CREDENTIAL
<"{"client_id":"Evaluation version of Web-x SDK","credentials":{"_reserved
_":"_reserved_","[f593c54bb1fa84203,4aef467ac3443c71a0833141","getText2"]","datetime":"9/3/2020
2:33PM","signature":"b46738b03ad83f8c03bed949ca400ebcb8860075"}"
> getText2
< f(position){
    let t2 = document.body.children[position];
    return t2.textContent;
  }
> getText2(11)                                                    registered function executed
<"I THOUGHT IT WAS LIKE THAT" "IT IS LIKE A PRESENT THAT HE SMILED LIKE A CHILD" "THE THINGS THAT KOREAN PEOPLE
LIKE" "YES, JUST TO TRYING TO THINK OF." "... BY GETTING TO KNOW THE PROFESSOR..." "HE ASKED..."

> let t2 = document.body.children[11];
>Uncaught TypeError: Cannot read property 'children' of null    non-registered function blocked    VM425:1
    at <anonymous>:1:24
```

FIG. 9

METHOD FOR PROVIDING SERVICE FOR SECURITY OF WEB-BROWSER-BASED CONTENT

BACKGROUND OF THE INVENTION

Field of the Invention

The present disclosure relates to a method for providing a service for security of a web-browser-based content. More particularly, the present disclosure relates to a method for providing a service for security of a web-browser-based content that increases security of an original content by inserting garbage characters into a text constituting an HTML-based original content, which can be opened through a web browser, to secure the original content, and by enabling only authenticated functions to be executed when calling functions for removing the garbage characters and performing functions related to the original content.

Description of the Related Art

Exchange of data and the amount of information are rapidly increased due to development of a digital contents technology and data transmission media. In general, various kinds of digital contents such as movie, music, documents, pictures, etc. are produced and are shared and quickly distributed through the internet, P2P, or webhards, so it is easy to obtain contents.

A social problem due to such data sharing is an infringement of a copyrighter due to illegal sharing of Security technologies such as copyrighted digital contents. Digital Rights (DRM), watermarking, and Management fingerprinting are applied and used to keep the right of copyrighters and prevent harm to users due to copyright infringement cases about digital contents.

For example, a contents provider who provides contents related to e-books in accordance with electronic publication (EPUB) standards can usually encode contents into a DRM type on the basis of personal certificates and then distribute the contents to users and users can use the contents by decoding the encoded contents using personal certificates through an exclusive viewer installed in terminals.

However, recently, cases of distributing e-book contents on the basis of web and opening e-book contents to use through a web browser are increased, and it is required to install specific programs such as ActiveX in order to apply existing security technologies to e-book contents on a web browser. However, web browsers gradually exclude such programs, so there is a problem that it is difficult to apply the existing security technologies.

Accordingly, it is required to take measures for coping with an infringement of copyrighted products for e-book contents that are provided on the basis of web browsers.

SUMMARY OF THE INVENTION

An objective of the present disclosure is to perform obfuscation by inserting a garbage character into an HTML-based content and insert a security module for calling a function for removing the garbage character into the content such that when the content is opened, a security module based on a system API provided by the web browser is executed and the content is restored through the security module; to insert credential information including hash information for each of functions included in a custom module into the custom module to authenticate the custom module that is created on the basis of JavaScript by a developer, is inserted into the content, is executed and provides one or more functions when the content is opened; to create has information about a caller through the security module monitoring callers accessing a system function of the web browser through hooking when the caller that calls a system function provided by a system API on the web browser to open the content is not a caller defined in the security module; and then to give support such that a system function called by the caller is executed only when the hash information coincides with the credential information, thereby enabling only functions registered in authenticated security module and a custom module to access a content and according being able to increase the degree of security of a content that is executed on a web browser.

A method for providing a service for security of a web-browser-based content of a service providing system that distributes an HTML-based original content to a web browser of a user terminal according to an embodiment of the present disclosure may include: a character setting step of creating and storing one or more garbage character based on a plurality of original characters constituting the original content; a content processing step of creating a security content obfuscating the original content by inserting one or more garbage characters, which randomly selected from a plurality of pre-stored garbage characters, into the original content; a security processing step of creating a security module that calls one or more functions for restoring the security content into the original content of APIs provided by a web browser, of creating, encoding, and inserting credential information, in which hash information and a function name for each of one or more callers included in a custom module are matched and included through the security module when creating the custom module including the one or more callers that call the API-based system function, in order to perform one or more functions related to the original content, and of inserting the security module and the custom module into the security content; and a distributing step of creating function recognition information for a caller that is not a caller defined in advance in the security module of callers that call the system function on the web browser by hooking an API of the web browser, and then of setting the security module into a distribution mode and then transmitting the security content to the web browser in order to operate the security module such that a caller corresponding to the function recognition information is allowed to call a system function when credential information coinciding with the function recognition information exists in the custom module.

The present disclosure has the following effects. In order to restore a security content, which has been obfuscated by inserting a meaningless garbage text into an HTML-based original content, into an original content, the present disclosure inserts a security module created on the basis of JavaScript that is supplied by HTML into the security content, thereby providing the security content a user terminal. Accordingly, it is possible to effectively protect an e-book content that is provided to a web browser from a copyrighted product infringement so that only a user who has the right to open the origin content can open the origin content through a security module constructed by a system API that is supported on the web browser without installing a specific program. Further, the present disclosure performs an authentication procedure on a caller that calls a system function that is provided by a system API on a web browser through the security module hooking the system API of the web browser in the process of opening an original content using a security content, and gives support such that only the system function called by the authenticated caller is executed. Accordingly, it is possible to easily prevent a user who does not have the right to open the original content on the web browser from constructing a non-authenticated function and from abnormally accessing the original content without installing a specific program linked to the web browser. Therefore it is possible to easily prevent a copyrighted product infringement for a web browser-based original content.

Further, the present disclosure, for a custom module, which is created by a developer and is executed and provides a function related to an original content when the original content is opened using the security content, creates credential information including hash information for each of functions included in the custom module and then insert the custom module including the credential information into the security content such that security content is distributed; allows only a security module to access a system API of the web browser while blocking other modules through hooking the security module in the process of opening the original content using the web browser; and then, when a caller included in a customer module or an external module that is not the security module calls a system function, creates hash information for the caller and compares the hash information with the credential information such that the system function is executed by only an authenticated caller, whereby a caller that is not an authenticated caller is prevented from accessing the original content by calling a system function, thereby being able to easily block access by illegal users and increase the degree of security of an HTML-based content.

Further, the present disclosure extracts an original character included in an e-book content and sets the original character as a garbage character in an obfuscation process for security of the e-book content such that the original character and the garbage character are difficult to discriminate, so it is possible to degree of security of an e-book content.

BRIEF DESCRIPTION OF THE DRAWINGS

The above and other objectives, features and other advantages of the present invention will be more clearly understood from the following detailed description when taken in conjunction with the accompanying drawings, in which:

FIGS. 2 to 4 are operation example diagrams about creation and transmission of a security content of the service providing system according to an embodiment of the present disclosure;

FIGS. 5 and 6 are an operation flowchart and an operation example diagram of a security module that is inserted in a security content according to an embodiment of the present disclosure;

FIGS. 7 to 9 are operation example diagram of a process of restoring and opening a content by the security module according to an embodiment of the present disclosure.

DETAILED DESCRIPTION OF THE INVENTION

Hereafter, a service providing method of a service providing system for security of web browser-based contents according to an embodiment of the present disclosure is described in detail with reference to the drawings.

Before description, the present disclosure provides a configuration that can create a security content through a method to be described below on the basis of a Hypertext Markup Language (HTML)-based original content, which is executed on a web browser, to secure the original content, that can support the security content to be able to be restored into the original content through a security module to be described below in a user terminal, that supports a developer to be able to develop and insert an external module including one or more functions, which is executed and provides various functions in relation to the original content when the original content using the security content in the user terminal, into the original content such that authentication is performed on the basis of hash information of a caller, which is a function of calling a system function provided from a system API of a web browser to access the original content, in the security module that has hooked the system API when opening the original content using the security content on the web browser, and that selectively allows only a caller related to an authenticated external module to access (call) a system function such that the system function is executed, thereby increasing security for the original content.

An HTML-based e-book is exemplified as the original content in the following description, but the present disclosure it not limited thereto and may be applied to various HTML-based contents.

Figure 1:
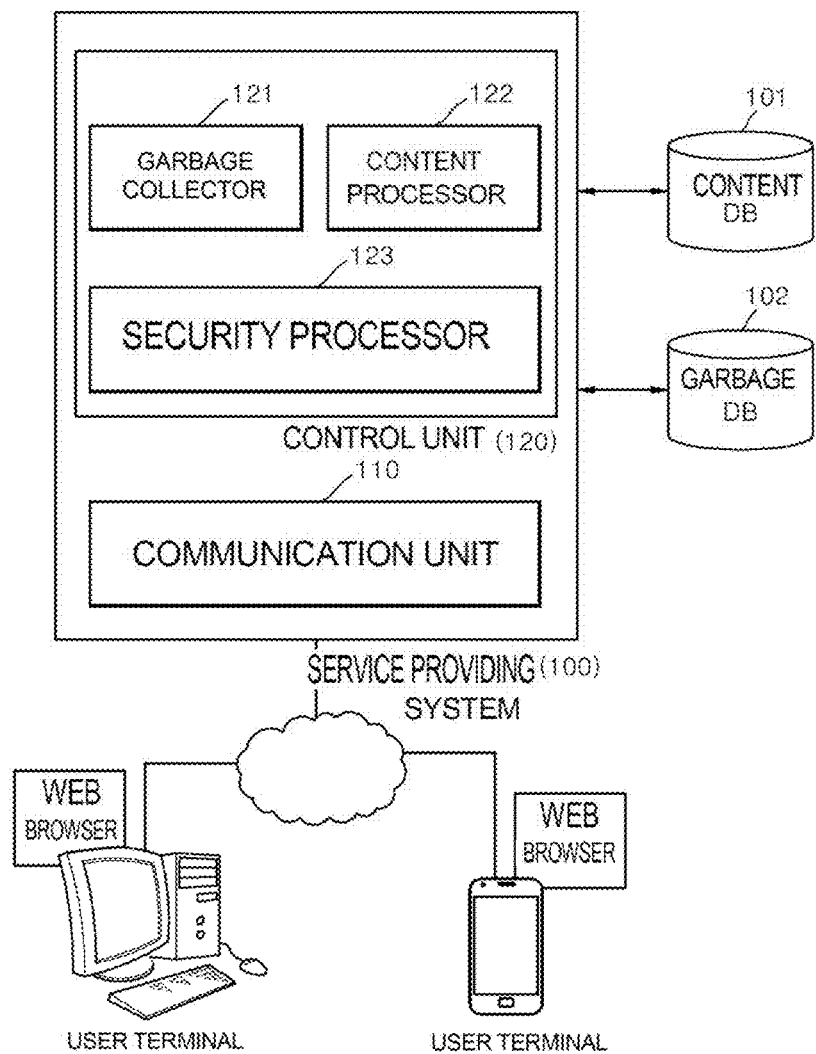
FIG. 1 is a configuration environment diagram of a service providing system for security of web browser-based contents according to an embodiment of the present disclosure.

FIG. 1 is a configuration environment diagram of a service providing system for security of web browser-based contents (hereafter, a service providing system) according to an embodiment of the present disclosure.

As shown in the figure, the service providing system 100 may include: a contents DB 101 that stores e-book contents; a control unit 120 that creates a garbage character on the basis of a plurality or original characters constituting an e-book content by extracting the e-book content from the contents DB and then stores the garbage character into the garbage DB 102 included in the service providing system 100 and that creates a security content obfuscating the e-book content such that the specifications of the e-book content are difficult to be recognized by inserting the garbage character stored in the garbage DB 102 into the e-book content 120; and a communication unit 110 that communicates with a web browser of a user terminal.

In this case, the service providing system 100 may be a server that communicates with the user terminal through a communication network and the control unit 120 can communicate with a web browser of the user terminal through the communication unit 110.

Alternatively, the service providing system 100 may be a developer terminal of a developer.

Further, the communication network described in the present disclosure may include wired/wireless communication networks, and the wireless communication network may include Wireless LAN (WLAN), Digital Living Network Alliance (DLNA), Wireless Broadband (Wibro), World Interoperability for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), a 5G mobile communication service, Bluetooth, Long Range (LoRa), Radio Frequency Recognition (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, etc. Further, the wired communication network may include a Local Area Network (LAN), a wired Wide Area Network (WAN), Power Line Communication (PLC), USB communication, Ethernet, serial communication, an optical/coaxial cable, etc.

Further, the user terminal or the developer terminal may include various terminals such as a smart phone, a portable terminal, a mobile terminal a Personal Digital Assistant (PDA), a Portable Multimedia Player (PMP) terminal, a telematics terminal, a navigation terminal, a personal computer, a notebook computer, a slate PC, a tablet PC, and an ultrabook.

Further, the control unit 120 of the service providing system 100 performs a general control function of the service providing system 100 and may include a RAM, a ROM, a CPU, a GPU, and a bus, and the RAM, ROM, CPU, GPU, etc, may be connected to each other through the bus.

Further, the control unit 120 can communicate with the user terminal through the communication unit 110.

Meanwhile, the control unit 120 can transmit a web page including list information of one or more e-book contents stored in the contents DB 101 to a web browser of the user terminal. Further, when receiving request information about a request of an e-book content selected by the user of the user terminal through the web page from the user terminal, the control unit 120 can recognize and extract a specific e-book content corresponding to the request information, can create the specific e-book content into a security content, and then provide the security content to the web browser of the user terminal.

In this case, the e-book content and the security content may be web contents composed of HTML and JavaScript.

Further, a security content obfuscated by inserting a garbage character into the e-book content is a content of which the details cannot be read by the user of the user terminal, so the security content has to be restored into an e-book content to be read.

A method of downloading and installing a restoration program, which is a plug-in program such as Activex, in a user terminal and restoring the security content into an e-book by executing the restoration program on the web browser is used to the restore a security content into an e-book content is used in the related art, but recently, such plug-in programs are gradually excluded from web browsers, so such plug-in type restoration programs will not be able to be used on web browsers in the future.

Accordingly, the service providing system 100 according to the present disclosure can insert a security module based on JavaScript, which is supported by Hyper Text Markup Language (HTML), into a security content security-processed by obfuscating the e-book content so that when the security content is opened, the security module is executed on the basis of HTML and the security content is restored (converted) into the e-book content through the security module.

Further, the service providing system 100 can create a custom module by receiving functions constituting a custom module for performing (providing) one or more functions related to an e-book content when executing the e-book content, and can create and put (insert) credential information including hash information and a function name of each of one or more functions constituting the custom module into the custom module.

In this case, the custom module may be a JavaScript-based module.

Further, when data related to the custom module in which credential information of each of one or more functions are created, the service providing system 100 can insert the custom module into the security content on the basis of the data related to the custom module.

Further, the service providing system 100 can transmit the security content including the custom module to the user terminal.

Further, the service providing system 100 recognizes a caller (or an API caller) of a system function according to caller information of the caller, which is a function for accessing a system Application Program Interface (API) by calling the system function, which is a function provided by the system API, from a web browser of a user terminal, in which the security content has been executed, by hooking the system API of the web browser when it is executed in the web browser; can create function recognition information including the function name of the caller, hash information corresponding to caller information about the caller, and the system function when the system function is not the function called by the caller of the security module on the basis of the recognized caller and then can create the security module such that authentication is performed on the caller by comparing one or more items of credential information included in the custom module; and can create the security module that is operated such that a system function called by a caller is not executed by preventing access to a system API of the caller corresponding to the function recognition information when there is no credential information coinciding with the function recognition information as the result of authentication.

Accordingly, when a caller that accesses a security content corresponding to an e-book content on a web browser is not an abnormal function (non-authenticated function) that is not a function included in a security model and is the service providing system 100 and is different from a function defined in a custom module, the service providing system 10 can easily prevent a copyrighted product infringement of the e-book content by preventing the corresponding function from being executed on a web browser of the user terminal.

An operation example of the service providing system 100 that performs the function described above is described hereafter in detail with reference to figures on the basis of the configuration described above.

A caller that is described in the present disclosure may be a function and a system function that is described in the present disclosure may mean a function that is provided from a web browser-based system API or a function included in a system API.

Figure 2:
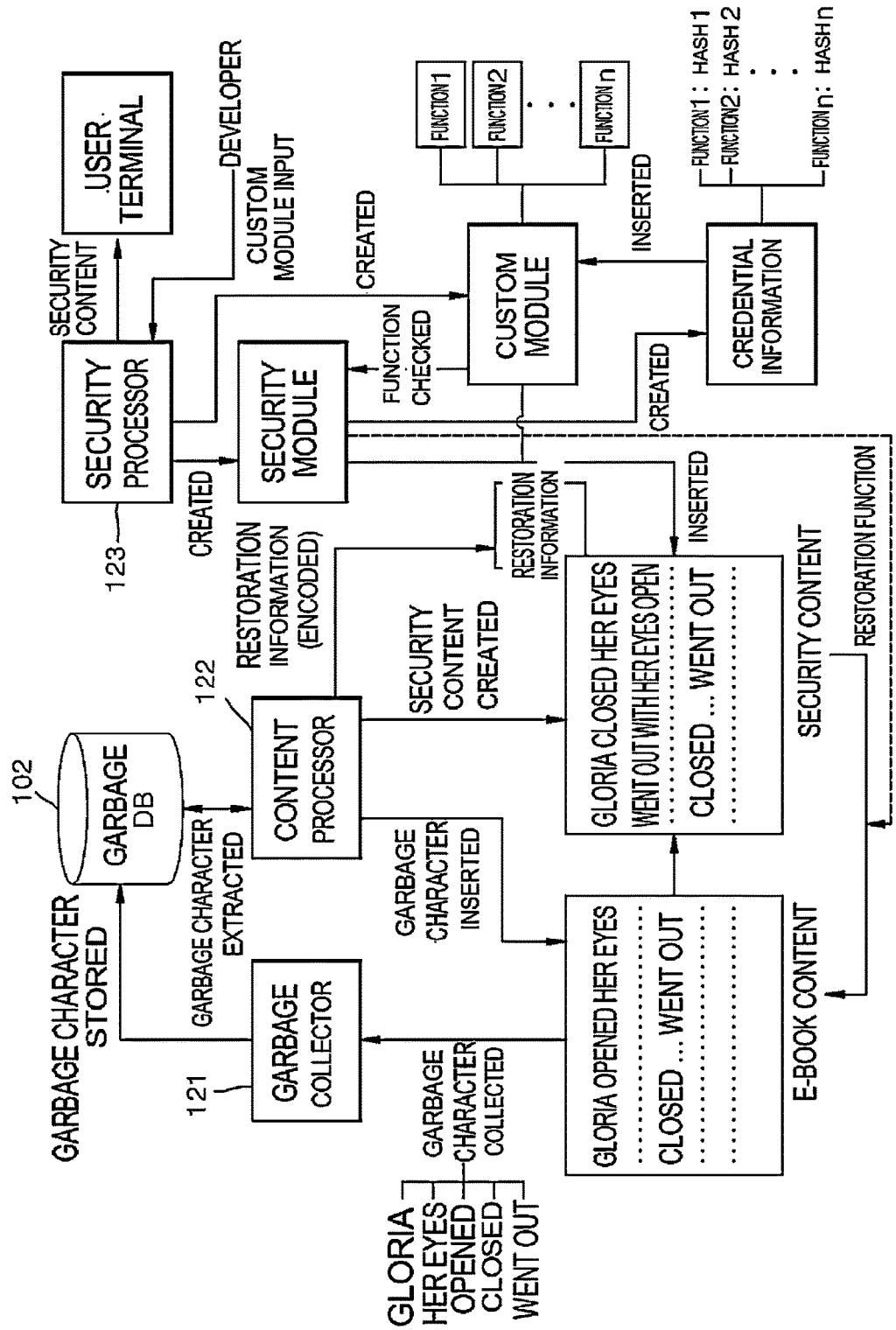

First, FIG. 2 is an operation example diagram about creation and transmission of a security content by the service providing system 100 according to an embodiment of the present disclosure.

Further, as shown in FIGS. 1 and 2, the control unit 120 may include a garbage collector 121, a contents processor 122, and a security processor 123.

First, the garbage collector 121 can extract an e-book content corresponding to request information received from the user terminal from the contents DB 101, can extract and collect a plurality of original characters constituting the e-book content from the e-book content, and can create and store one or more garbage character in the garbage DB 102 on the basis of the plurality of original characters.

In this case, the service providing system 100 may further include a storage and the storage may include the contents DB 101 and the garbage DB 102.

For example, the garbage collector 121 can create one or more garbage characters by extracting a plurality of original characters constituting the e-book content and setting each of the plurality of original characters as a garbage character, and can store the garbage characters into the garbage DB 102.

As another example, the garbage collector 121 can create one or more garbage character by dividing the extracted original characters in the unit of word and setting one or more original characters divided and grouped in the unit of word as garbage characters, and can store the garbage characters created in the unit of word into the garbage DB 102.

In this case, the garbage collector 121 can content recognition information of an e-book content corresponding to the request information from the contents DB 101, and can matching and storing a plurality of garbage characters obtained from the e-book content corresponding to the request information with the content recognition information extracted in correspondence to the request information into the garbage DB 102.

An e-book content to be described hereafter may be an e-book content corresponding to the request information.

Further, the content processor 122 can create a security content obfuscating an e-book content such that the e-book content is difficult to be read by inserting one or more garbage characters, which are randomly selected from a plurality of garbage stored in advance in the garbage DB 102, into the e-book content.

In this case, the contents processor 122 can recognize a plurality of garbage characters matched with the content recognition information corresponding to the e-book content from the garbage DB 102 and can insert the garbage characters into the e-book content, whereby it is possible to enable garbage characters obtained from a specific e-book content to be used only for the specific e-book content.

The process of creating a security content by the content processor 122 is described in more detail with reference to FIGS. 3 and 4.

Figure 4:
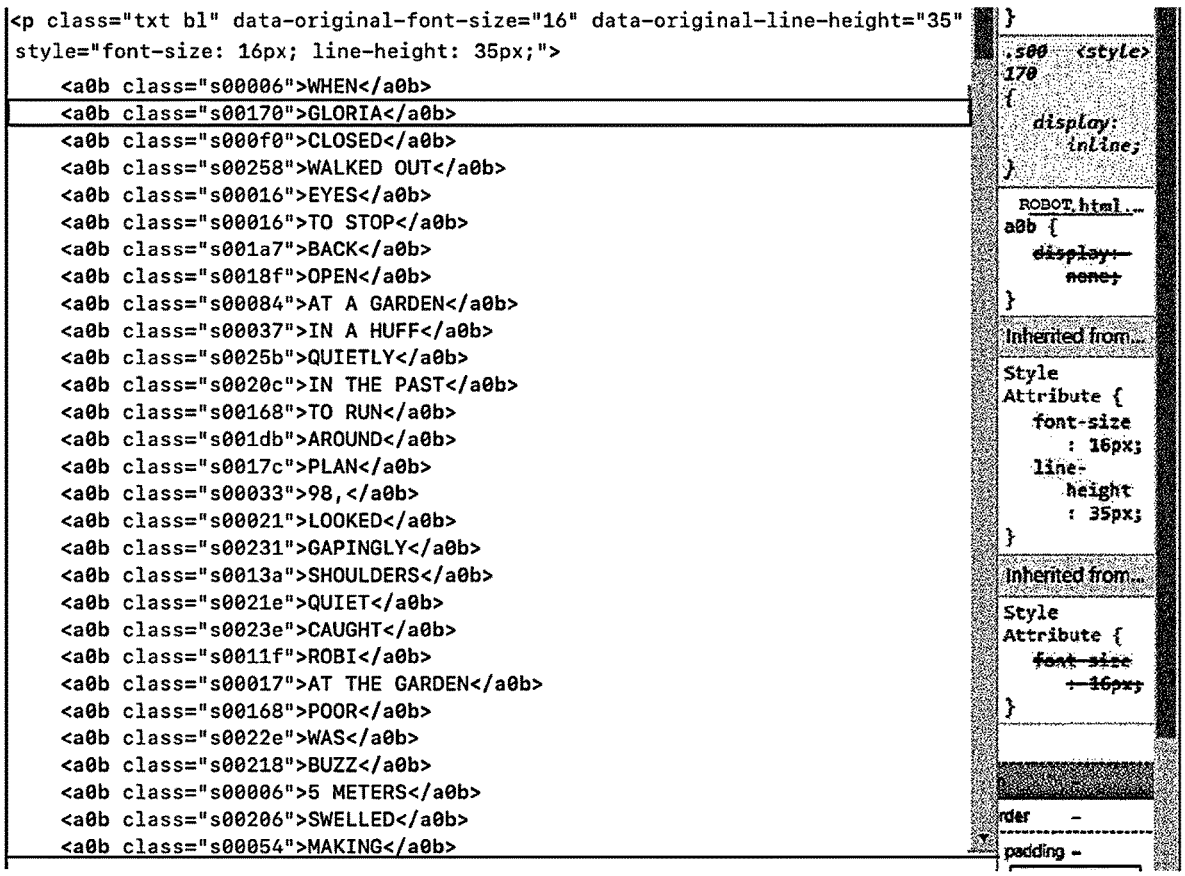

First, as shown in FIGS. 3 and 4, the content processor 122 can create a plurality of unit characters by dividing a plurality of original characters included in an e-book content configured by HTML into the unit of word or the unit of character.

That is, the content processor 122 can convert the e-book content into an e-book content in which the plurality of unit characters is created (included).

In this case, the unit character may be composed of one or more text grouped in accordance with the division in the unit of word or the unit of character of a plurality of texts included in the e-book content, and the main text of the e-book may be configured of the plurality of unit characters.

Further, the unit character may be one or more original characters or may be one original character.

Next, as shown in FIG. 4, the contents processor 122 sets an original security tag, which is supported by HTML for discrimination from other unit characters and recognition of other unit characters, on each of the plurality of unit characters included in the e-book content, and inserts one or more garbage character randomly selected from a plurality of garbage characters stored in advance in the garbage DB 102 and a garbage security tag supported by HTML for discrimination from the original security tag every between original security tags in the e-book content, thereby being able to create a security content obfuscating the e-book content.

That is, the content processor 122 can create a security content that is an e-book content including the original security tag, the garbage characters, and the garbage security tag by inserting the original security tag, the garbage characters, and the garbage security tag in to the e-book content including the plurality of unit characters.

For example, the content processor 122 devices an original text such as "Gloria opens her eyes . . . " included in the e-book content into the unit of words, thereby being able to original text into a plurality of different unit characters of "Gloria", "opens", and "her eyes".

Further, the contents processor 122 can set an original security tag, which is a tag based on HTML (executed by HTML) for discrimination from garbage characters, in the separated unit characters.

Further, the content processor 122 can recognize a first original security tag set for "Gloria" that is the first unit character and a second original security tag set for "her eyes" that is the second unit character as original security tags adjacent to each other, can randomly select at least one of a plurality of garbage character stored in advance in the garbage DB 102 to correspondence to an e-book content, can insert "closed", which is the selected garbage character, between the first original security tag set for the first unit character the second original security tag set for the second unit character, and can set and insert a garbage security tag, which corresponds to the garbage character for the garbage character inserted between the first and second original security tag, in the e-book content.

In this case, the garbage character described in the present disclosure a unit garbage character composed of one or more characters.

Further, the garbage security tag may be a tag that is based on HTML (executed by HTML) for discrimination (distinction) from an original character and recognition of a garbage character.

Further, the contents processor 122 may include a plurality of different unit garbage characters and a plurality of garbage security tags corresponding to the plurality of different unit garbage characters, respectively, between the first original security tag and the second original text security.

For example, the contents processor 122 can sets a first garbage security tag for "closed" that is a first garbage character and a second garbage security tag for "went out" that is a second garbage character while inserting "closed" that is the first garbage character and "went out" that is the second garbage character between the first original security tag and the second original security tag, thereby being able to insert the first and second garbage security tags between the first original security tag and the second original security tag.

As described above, the contents processor 122 divides a plurality of original characters included in the e-book content into a plurality of unit characters and inserts the garbage characters, the original security tags, garbage security tags into the e-book content, as described above, thereby being able to create the e-book content into a security content including the garbage characters, the original security tags, and the garbage security tags.

Further, the contents processor 122 can create restoration information for recognizing the original security tags and the garbage security tags when creating the original security tags and the garbage security tags in the process of creating the security content.

Further, every time the contents processor 122 sets (creates) any one of new original security tag and garbage security tag, the contents processor 122 can add the one to the restoration information.

Further, the contents processor 122 may put the security content when restoration information into the finishing creating a security content.

In this case, the contents processor 122 can encode the restoration information in accordance with a preset encoding algorithm and can put the encoded restoration information into the security content.

For example, the contents processor 122 can create an encryption key (license) in accordance with the encoding algorithm and can encode the restoration information in accordance with the encoding algorithm using the encryption key.

In this case, the contents processor 122 can encode the restoration information using an electronic signature.

Other than the above components, the contents processor 122 creates security option information including at least one of first option information enabling the e-book content at a specific uniform resource (URL), second option locator information about whether to activate a print function when opening the e-book content, third option information about whether to activate a click when opening the e-book content, fourth option information about whether to active a print screen function when opening the e-book content, and fifth option information about whether to insert watermarking when opening the e-book content; encodes the security option information using the encryption key; and insert the security option information into the security contents, thereby being able to put the security option information into the security content.

Meanwhile, the security processor 123 can create a security module that calls one or more system functions for restoring the security content into the e-book content of a plurality of system functions included in a system Application Program Interface (API) that is provided from a web browser of the user terminal when the security content is created.

That is, the security module calls the one or more system function, thereby being able to restore the security content into the e-book content.

In this case, the security processor 123 can create the security module on the basis of JavaScript. That is, the security module may mean a module constructed through JavaScript.

Further, the system function described in the present disclosure may include system functions (e.g., getElementsByTagName, getElementsByClass, etc.) and Document Object Model (DOM) properties (e.g., document.body, document.children, document.firstElementNode, element-.nextSibling, etc.) of all system functions that can be used to access a test to which security is applied using JavaScript.

Meanwhile, the storage can store Software Development Kit (SDK)-related data for creating a custom module including one or more functions that perform one or more functions related to the e-book content, and the service providing system 100 may further include an input unit that receives external input or may communicate with an external terminal that requests the SDK-related data to create the custom module through the communication unit 110.

In this case, the external terminal may be a developer terminal that creates a customer module using the SDK.

Further, the function that the custom module provides, for example, may include various functions such as a function of providing a user interface for opening the e-book content and a function of automatically playing video included in the e-book content. In this case, the user interface can provide various functions such as font changing and font size changing.

Further, the security processor 123 executes SDK on the basis of the SDK-related data from the storage unit on the basis of the external input and creates codes according to external input using the SDK, thereby being able to create a custom module that includes one or more functions of performing one or more functions related to the e-book content and corresponds to the e-book content.

Alternatively, the security processor 123 transmits the SDK-related data to the external terminal and receives custom module-related data created using the SDK-related data from the external terminal through the communication unit 110, thereby being able to create a custom module on the basis of the custom module-related data.

In this case, at least one of one or more functions included in the custom module may be a function that calls a system function, a system function and a user-defined function may be further included.

That is, the service providing system 100 including the security processor 123 gives support such that the custom module corresponding to the e-book content can be created through the SDK using data transmitted/received to/from the external terminal, and can allow a developer to freely produce various custom modules so that various functions can be provided in relation to an e-book content through the custom module.

However, a copyrighted product infringement of an e-book content may be generated through a non-authenticated module, which accesses an e-book content, in the process of allowing the custom module to access the e-book content, there is a need for configuration that allows only an authenticated custom module to access an e-book content and prevents a function called by a non-authenticated module from accessing the e-book content.

To this end, the security processor 123 creates credential information to be able to prevent abnormal access in which a user terminal, which opens the e-book content through a web browser, creates an external module including a non-authenticated function other than the custom module or the security module and then accesses the e-book content through the external module, thereby being able to give support to secure the e-book content, which is described with reference to the flowchart of security process on an e-book content using a security module shown in FIG. 5 and the exemplary diagram of a security process shown in FIG. 6.

Figure 5:
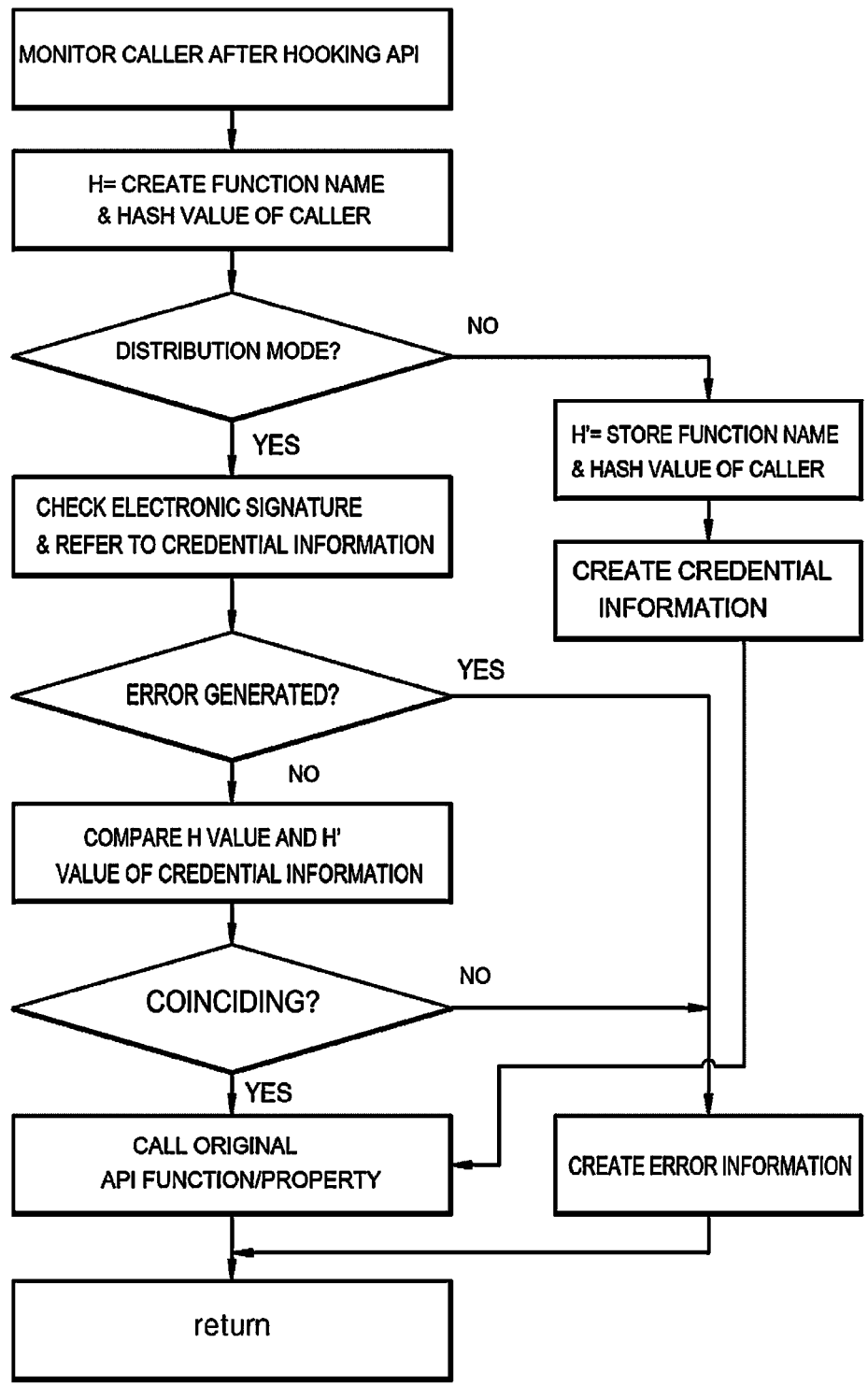

Further, as shown in FIGS. 5 and 6, the security processor 124 can sets the security module as a development module in the process of creating the custom module and the security module set as a development module can create hash information including a has value for each of one or more functions included in the custom module by applying a preset has algorithm to the security module for each of one or more functions included in the custom module.

In this case, the function included in the custom module that is applied to the has algorithm may be text information including the function name of the function, property names set in the function, a parameter of each of the properties, etc.

Further, the security module set as the development module can create credential information in which the created hash information and the function name are matched and included for each of one or more functions created to be included in the custom module.

That is, the security module can create hash information for each of one or more functions included in the custom module and can create credential information including a function name and hash information for each of the one or more functions.

In this case, the security module can the credential information for a function corresponding to a caller that calls a callee of one or more functions included in the custom module, and the hash information included in the credential information may be information created by applying a hash algorithm to all texts (all texts constituting a function including a function name, a property name, a property value, etc.) included in the function corresponding to the caller.

Further, the security processor 123 or the security module can encode and insert the credential information into the custom module using the encryption key.

In this case, the security processor 123 or the security module may encode the credential information using the encryption key used to encode the restoration information or using a specific encoding algorithm.

Further, the security processor 123 or the security module may encode the credential information using an electronic signature.

As described above, the security processor 123 or the security module can match and then insert the credential information encoded by the encryption key with a function, which corresponds to the credential information of one or more functions included in the custom module, into the custom module, thereby being able to put the encoded credential information into the custom module.

Further, the security processor 123 can insert the custom module into a security content corresponding to the e-book content when finishing creating the custom module corresponding to the e-book content.

In accordance with the above description, the security processor 123 can create credential information, in which the hash information and the function mane are matched for each caller (or caller function), which calls an API-based system function provided on a web browser, as a callee function from one or more functions included in the custom module, through the security module set as a development module.

Further, the security processor 123 can encode and the inset one or more items of credential information created to correspond to one or more functions (or callers) included in the custom module, respectively, into the custom module, and can put the one or more items of credential module into the security content corresponding to the e-book content by inserting the credential information into the security content.

Further, the security processor 123 can put the security module into the security content by inserting the security module into the security content.

Further, when finishing the security content in which the security module and the custom module are inserted to correspond to the e-book content, the security processor 123 can transmit the security content to a web browser of the user terminal.

Figure 7:
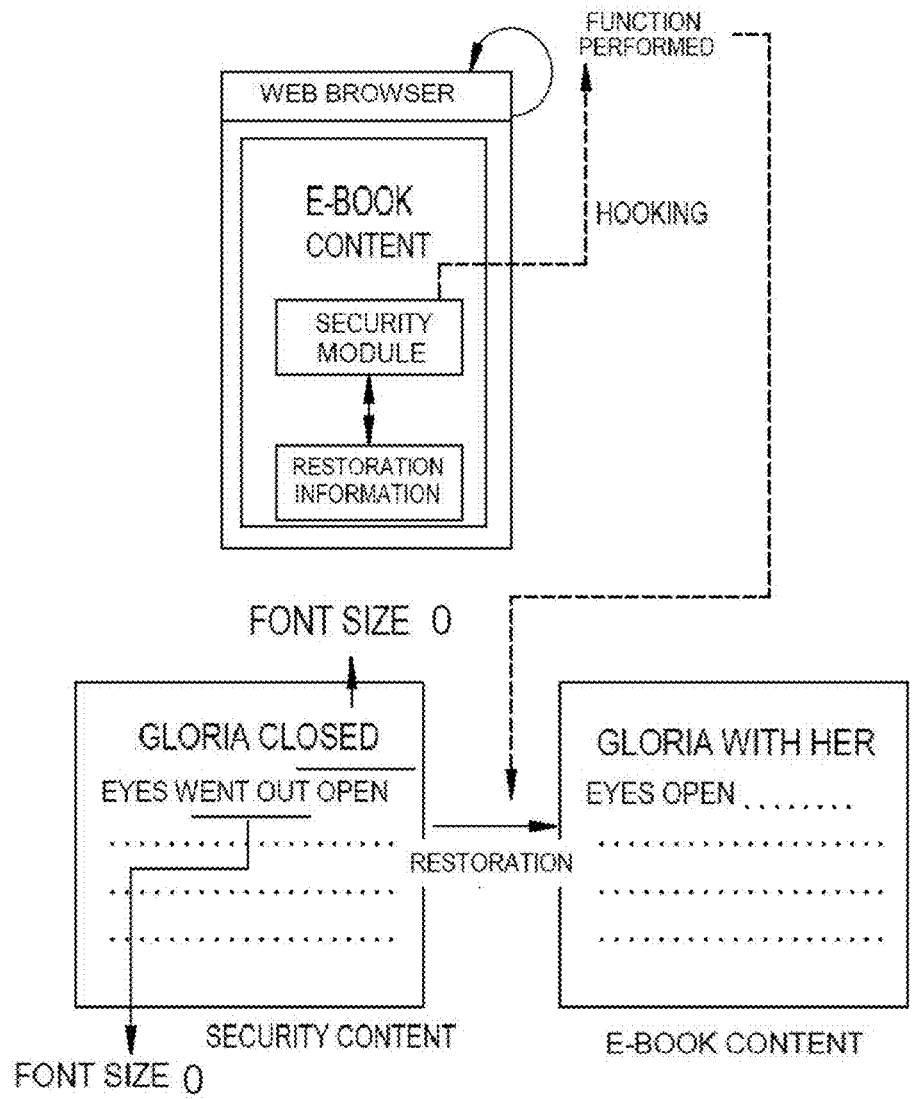
Figure 8:
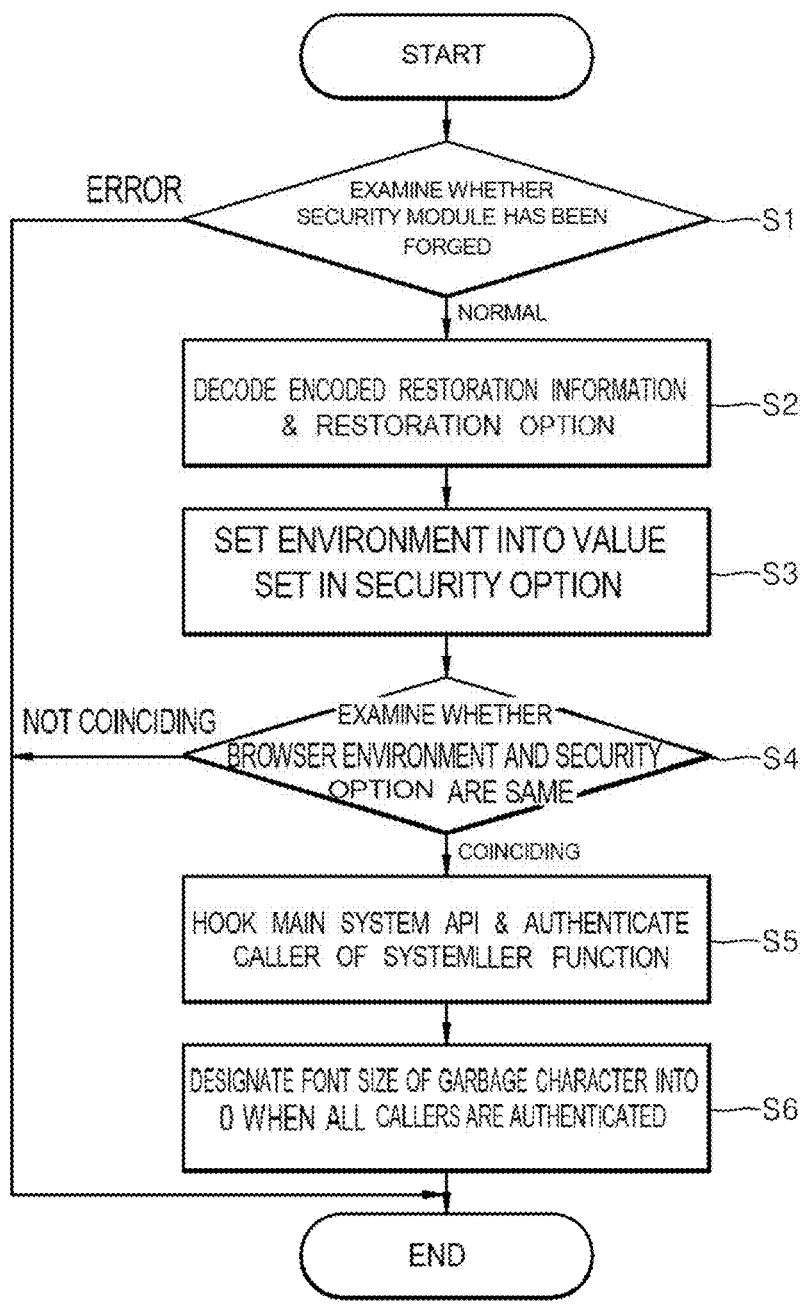

Meanwhile, FIG. 7 is an operation example diagram of the security module in the process of opening an e-book content using the security content on a web browser of a user terminal and FIG. 8 is an operation flowchart of the security module in the process of opening an e-book content using the security content on a web browser of a user terminal.

As shown in the figures, when receiving request information for requesting distribution of the e-book content from a user terminal connected to the service providing system 100 through a web browser of the user terminal, the control unit 120 or the security processor 123 of the service providing system 100 can a HTML-based security content, which corresponds to the e-book content and in which the custom module and the security module are inserted, to the web browser of the user terminal.

In this case, the security processor 123 can set the security module included in the security content as a distribution mode when distributing the security content.

Further, the web browser of the user terminal (hereafter, a web browser) can receive the HTML-based security content from the service providing system 100 in correspondence to the request information for requesting the e-book content.

Further, the web browser loads and executes the security content when receiving the security content, thereby attempting to open the security content.

Further, the web browser can execute the security module included in the security content when opening the security content.

That is, the security module can be automatically executed when the security content is executed through the web browser.

In this case, the security module set in the distribution mode can prevent a function of a caller accessing a system API, which is provided by the web browser, by hooking the functions and main properties included in the system API, and can monitor a caller accessing the system API by calling the system functions of the system API.

Further, when receiving caller information about a caller accessing a system API and a specific system function, which is provided by the system API, by calling the specific system function, the security module can allow the caller of the caller information to access the system API for the specific system function called by the security module (when the caller of the system function is a pre-defined caller) on the basis of the caller such that the specific function is called.

Further, the security module can check whether the security module has been forged, through one or more functions called by the security module on the web browser (S1), and can decode restoration information included in the security content using a pre-set decryption key through the called one or more functions.

In this case, the one or more functions that are called by the security module may include a system function, and may include functions other than the system function.

Further, when security option information is included in the security content, the security module can decode the security option information encoded with the encryption key using the decryption key (S2), and then can set an environment property for the operation environment of the web browser as a value set in the decoded security option information (S3).

For example, the security module may set an environment property for the operation environment of the web browser in accordance with security option information including at least one of first option information allowing the e-book content only at a specific URL, a second option information about whether to activate a print function when opening the e-book content, third option information about whether to activate a click when opening the e-book content, fourth option information about whether to active a print screen function when opening the e-book content, and fifth option information about whether to insert watermarking when opening the e-book content.

Accordingly, the security module can determine whether the operation environment of the web browser set in accordance with the security option information coincides with the security option information (S4), and can perform the following process of restoring the security content into the e-book content only when the coincide with each other.

Further, the security module can call one or more functions set in the security module, and one or more functions called by the security module are executed on the web browser, whereby it is possible to recognize at least one of the original security tag and the garbage security tag in the security content on the basis of the decoded restoration information.

The restoration information to be described bellows may be in a decoded state.

Further, one or more functions called by the security modules can recognize one or more garbage characters included in the security content on the basis of the garbage security tag recognized from the security content on the basis of (in accordance with) the restoration information, and can restore (or convert) the security content into the e-book content by converting (setting) the font size of the garbage character into (as) 0 such that the garbage character is not shown and only the original character is shown.

In this case, 'restoration' described in the present disclosure may be replaced with 'conversion'.

Meanwhile, the security module inserted in the security content by the security processor 123 can prevent abnormal access to the e-book content through an external module including a non-authenticated function except for the custom module or the security module in the user terminal that opens the e-book content using credential information created for the custom module, thereby giving support to secure the e-book content, which will be described with reference to FIGS. 5 and 8.

In this case, the security module that is operated in the user terminal can keep operating in the distribution mode.

First, the security module set in the distribution mode when the security content is transmitted to the user terminal is automatically executed when it is executed on the web browser, thereby being able to block a function of a caller accessing the system API of the web browser through hooking.

Further, when a caller that is a function calling the system function to access the system API on the web browser is generated (executed) after hooking, the security module can receive a caller and caller information including the specifications of a function corresponding to the caller from a specific module (or a caller module) that has executed the caller.

In this case, the security module can restore the security content into the e-book module, recognize the caller that calls the system function on the basis of caller information received in the process of opening the e-book module, and can determine whether the caller is the caller defined in advance in the security module.

For example, the security module can recognize the source of the specific caller on the basis of the function name of a specific caller included in the caller information, and can check whether the specific caller is the caller executed by the security module on the basis of the source.

Further, when the caller according to the caller information is the caller defined in advance in the security module, the security module can allow the caller of the security module to access the system API and call a system function and enables the system function to be called and executed by the caller of the security module.

Further, when the caller that calls the system function is not the caller defined in advance in the security module, the security module performs an authentication process on the caller on the basis of caller information received in correspondence to the caller, thereby being able to determine whether to allow the caller to access the system API and call the system function, depending on the result of authenticating the caller (S5).

In this case, the security module may determine that authentication has succeeded when the caller according to the caller information is the caller defined in advance in the security module.

As an example of the above description, the security module set in the distribution mode can block a caller accessing the system API on the web browser in accordance with the hooking, and simultaneously, can receive caller information, which includes text information including the function name and the function specifications of a specific caller accessing the system API, from a specific module that has executed the specific caller on the web browser.

In this case, the specific module that transmits the caller information may be the security module, the custom module, or an external module that has been constructed through coding by a user and has been executed on the web browser except for the security module and the custom module.

Further, the caller information may include text information including the function names of the specific caller executed on the web browser, the property names set for the functions of the specific caller, parameters of the properties set in the functions of the specific caller.

Further, the security module set in the distribution mode can recognize a specific caller corresponding to the caller information on the basis of the caller information.

Further, the security module set in the distribution mode, depending on the result of recognizing the specific caller, can allow the specific caller according to the caller information to access the system API when the specific caller is the caller defined in advance in the security module, and can authenticate the specific caller when the specific caller is not the caller defined in advance in the security module.

For example, the security module defined in the distribution mode may create hash information corresponding to the specific caller by applying the caller information of the specific caller, which has been determined as not being the caller defined in advance in the security module, to a hash algorithm set in advance in the security module.

Further, the security module can extract the function of the specific caller from the caller information of the specific caller, and can create function recognition information, which includes hash information created on the basis of the caller information and the extracted function name of the specific caller, to correspond to the specific caller.

Further, the security module can decode one or more items of credential information, which is included in an encoded state in the custom module included in the security module, for the custom module using a preset decryption key.

In this case, when decoding the credential information fails, the security module can create and display error information according to the failure of decoding on the web browser, and can stop restoration into the e-book content using the security content.

Further, when the security module is authenticated by the service providing device 100 through communication with the service providing apparatus 100 in the decoding process, the security module may receive the decryption key from the service providing system 100 and decode at least one of the restoration information, security information, and credential information.

Further, the security module can determine whether credential information including a function name that is the same as the function name of a specific caller according to the function recognition information exists in the custom module by searching the custom module on the basis of the function name of the specific caller when creating the function recognition information; can determine that the specific caller according to the function recognition information as a non-authenticated caller when credential information including a function name that is the same as the function name of the specific caller does not exist; and can prevent a system function that is called by the specific caller from being called and executed by preventing the specific caller from accessing the system API.

That is, when authentication of the specific caller fails, the security module keeps the specific caller from accessing the system API such that a system that is called by the specific caller is not called, thereby being able to prevent the system function that is called by the specific caller from being executed.

Further, when the specific caller is determined as a non-authenticated caller and authentication of the specific caller fails, the security module can create and display effort information about at least one of the specific caller and the system function called by the specific caller on the web browser of the user terminal.

Further, when credential information coinciding with the function name of the specific caller according to the function recognition information exists in the custom module as the result of searching the custom module on the basis of the function name of the specific caller, the security module can find and extract credential information including a function name that is the same as the function name of the specific caller according to the function recognition information from the custom module.

Further, the security module can determine whether the function recognition information and the extracted credential information coincide with each other by comparing the function name and the hash information of the specific caller included in the function recognition information with the function name and hash information included in the decoded credential information extracted in correspondence to the function recognition information.

In this case, the security module may compare all of one or more items of credential information included in the custom module with the function recognition information.

Further, when the function recognition information and the credential information coincide with each other as the result of determination, the security module determines that the specific caller according to the function recognition information has been authenticated, and allows the specific caller to access the system API, thereby being able to execute a system function that is called by the specific caller.

That is, when credential information including a function name and hash information, which coincide with a function name and hash information included in function recognition information created to correspond to the specific caller, exists the custom module, the security module determines that authentication of the specific caller has succeeded, and allows the specific caller to call a system function, thereby being able to execute the system function called by the specific caller according to the function recognition information in accordance with function specifications defined (set) in the caller information of the specific caller.

Further, when the function recognition information and the extracted credential information do not coincide with each other as the result of determination, the security module can determine that authentication of the specific caller has failed, and can display the error information on the web browser while keeping preventing the specific caller from accessing the system API.

That is, when credential information including a function name and credential information that coincide with the function name and the hash information included in the function recognition information does not exist, the security module can prevent the specific caller according to the function recognition information from accessing the system function such that a system function that is called by the specific caller, thereby being able to execution of the system function that the specific caller attempts to call.

As an example of the above description, as shown in FIG. 9, the security module can recognize "getText2" that is the caller of a system function that is provided by a system API when a function "document.body.children" that is the system function is called, and when the caller of the system function is not a caller defined in advance in a security module, the security module can create first hash information by applying text information constituting a function "getText2" that is the caller of the function "document.body.children" to as preset hash algorithm and can create function recognition information including "getText2" that is the function name of the caller function.

Further, the security module can decode one or more items of credential information included in the custom module using a preset decryption key.

Further, when credential information including the function name "getText2" exists as the result of searching the custom module of the security content on the basis of the function name "getText2", the security module can extract credential information matched with the function "getText2".

Further, the security module can determine whether the function recognition information and the extracted credential information coincide with each other by comparing the function name ("getText2") and second hash information included in the credential information with the function name ("getText2") and first hash information included in the function recognition information.

Further, the security module can determine whether the function recognition information has been authenticated in accordance with the result of determining coincidence.

Further, when, as the result of determination, the function name and the first hash information according to the function recognition information and the function name and the second hash information from obtained the credential information extracted in correspondence to the function recognition information coincide with each other, the security module can determine that authentication of "getText2" that is a caller corresponding to the function recognition information has succeeded, and when authentication succeeds, can allow "getText2" that is a caller corresponding to the function recognition information to access a system API, and can call "document.body.children" that is a system function that is called by the "getText2" such that the "document.body.children" function is executed on the web browser in accordance with the function specifications included in "getText2" according to the caller information.

Further, as the result of determination, when the first hash information created for "getText2" that is the caller according to the function recognition information and the second hash information found from the credential information extracted in correspondence to the function recognition information do not coincide with each other, the security module determines the authentication of the function recognition information has failed, and prevents "getText2" that is the caller from accessing a system API such that "document.body.children" that is the system function that is called by the "getText2" is not called, thereby being able to prevent "document.body.children" from being executed by the "getText2" and output preset error information including at least on of the "getText2" and the "document.body.children".

Further, referring to the example of FIG. 9, it can be credential information seen that since (WEB_X FUNCTION CREDENTIAL) that is a function "getText2" including a call for "document.body.children" that is a system function exists in a custom module, the function "document.body.children" is allowed to be called and the result of the function "getText2" is normally output; however, when it is attempted to extract a value by directly calling "document.body.children" fro a web browser debug console, execution is not allowed because caller (debug console) information that calls the system function does not exist in the credential information, so a value is not output.

As described above, the security module creates function recognition information every time a specific module (caller module) that is not the security module calls a system function based on a system API, thereby, as described above, being able to perform authentication on a caller corresponding to function recognition information.

Further, when error information is not created in the process of the security content into the e-book content, the security module can restore the security content into the e-book content and display the e-book content on the web browser (S6).

For example, when authentication of all of one or more callers that perform the process of restoring a security content into an e-book content succeeds, the security module make a system function be normally called for each of the one or more callers, thereby being able to restore the security content into the e-book content.

In this case, the restored e-book content is a content in which the font sizes of all garbage characters included in the e-book content (or security content) have been changed into 0.

Accordingly, the user of the user terminal can see the original of the e-book content displayed on the web browser through the display unit of the user terminal.

In the configuration described above, the security module and the web browser may be configured in the user terminal and executed by a control module that performs general control of the user terminal, the control module may include a RAM, a ROM, a CPU, a GPU, and a bus, and the RAM, ROM, CPU, GPU, etc, may be connected to each other through the bus.

As described above, in order to restore a security content, which has been obfuscated by inserting a meaningless garbage text into an HTML-based original content, into an original content, the present disclosure inserts a security module created on the basis of JavaScript that is supplied by HTML into the security content, thereby providing the security content a user terminal. Accordingly, it is possible to effectively protect an e-book content that is provided to a web browser from a copyrighted product infringement so that only a user who has the right to open the origin content can open the origin content through a security module constructed by a system API that is supported on the web browser without installing a specific program. Further, the present disclosure performs an authentication procedure on a caller that calls a system function that is provided by a system API on a web browser through the security module hooking the system API of the web browser in the process of opening an original content using a security content, and gives support such that only the system function called by the authenticated caller is executed. Accordingly, it is possible to easily prevent a user who does not have the right to open the original content on the web browser from constructing a non-authenticated function and from abnormally accessing the original content without installing a specific program linked to the web browser. Therefore, it is possible to easily prevent a copyrighted product infringement for a web browser-based original content.

Further, the present disclosure extracts an original character included in an e-book content and sets the original character as a garbage character in an obfuscation process for security of the e-book content such that the original character and the garbage character are difficult to discriminate, so it is possible to degree of security of an e-book content.

Further, the present disclosure allows for free construction of JavaScript programs for constructing a custom module providing various functions for an e-book content and gives support to be able to prevent a garbage text inserted in the e-book content from be abnormally deleted in order to prevent use of a bot for extracting a web-based content using a macro program or a function, such as a system API or a DOM property value that is executed by a JavaScript program not having the right to use an e-book content or in order to protect a web-based e-book content, thereby being able to further increase the degree of security of an e-book content.

Figure 10:
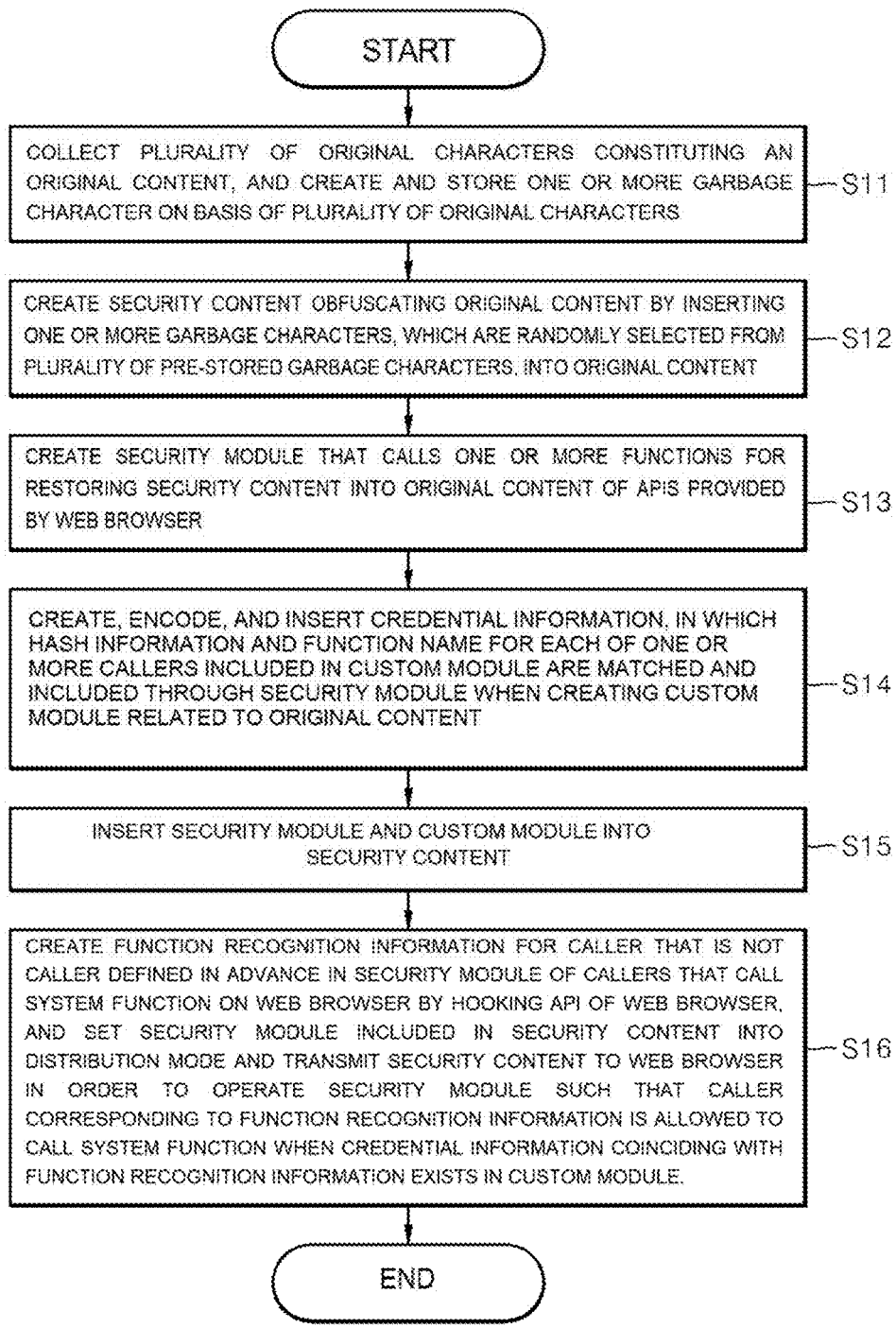
FIG. 10 is a flowchart of a method for providing a service for security of a web-browser-based content according to an embodiment of the present disclosure.

FIG. 10 is a flowchart of a method for providing a service for security of a web-browser-based content of the service providing system 100 that distributes an HTML-based original content to a web browser of a user terminal according to an embodiment of the present disclosure.

First, the service providing system 100 can create and store one or more garbage character on the basis of a plurality of original characters constituting an original content (S11).

Further, the service providing system 100 can create a security content obfuscating the original content by inserting one or more garbage characters, which are randomly selected from a plurality of pre-stored garbage characters, into the original content (S12).

Further, the service providing system 100 can create a security module that calls one or more functions for restoring the security content into the original content of APIs provided by a web browser (S13), can create, encode, and insert credential information, in which hash information and a function name for each of one or more callers included in a custom module are matched and included through the security module when creating the custom module including the one or more callers that call the API-based system function, in order to perform one or more functions related to the original content (S14), and can insert the security module and the custom module into the security content (S15).

Further, when receiving request information for requesting distribution of the original content from a web browser of the user terminal, the service providing system 100 can recognize a security content corresponding to the original content required to be distributed on the basis of the request information.

In this case, the service providing system 100, when receiving the request information, may create the security control, in which the security module and the custom module are inserted (included), on the basis of the original content corresponding to the request information, and then may recognize the created security content as a security content corresponding to the request information.

Further, the service providing system 100 can create function recognition information for a caller that is not a caller defined in advance in the security module of callers that call the system function on the web browser by hooking the API of the web browser, and then can set the security module included in the security content recognized in accordance with the request information into a distribution mode and can transmit the recognized security content to the web browser of the user terminal in order to operate the security module such that a caller corresponding to the function recognition information is allowed to call a system function when credential information coinciding with the function recognition information exists in the custom module (S16).

Further, the service providing system 100 can create hash information through a hash algorithm set in the security module for each of one or more callers included in the custom module by setting the security module into a development module in the process of creating the custom module, can create credential information including the created hash information and a function name of each of one or more callers included in the custom module, and then can encode and insert the credential information into the custom module.

Further, when receiving request information for distribution from the web browser of the user terminal, the service providing system 100 can set a security module of a security content corresponding to the request information into the distribution mode rather than the development mode.

Further, the security module set in the distribution mode can be executed by a web browser of the user terminal in accordance with execution of a security content of the web browser of the user terminal; can recognize a caller that calls a system function on the web browser; can create hash information by applying caller information including text information about a function of the recognized caller to a hash algorithm of the security module and then can create the function recognition information including a function name and hash information corresponding to the recognized caller when the recognized caller is not a caller defined in advance in a security module; can decode one or more items of credential information included in the custom module and then can compare the credential information with the function recognition information on the basis of the function name and the hash information; can prevent the recognized caller corresponding to the function recognition information from calling a system function when credential information coinciding with the function recognition information does not exist in the custom module; and can allow the recognized caller to call a system function such that the called system function is executed when credential information coinciding with the function recognition information exists in the custom module.

Various devices and component described herein may be achieved by a hardware circuit (e.g., a CMOS-based logic circuit), firmware, software, or a combination thereof.

For example, the components described in the embodiments may be achieved by one or more common computers or computers for specific purposes, such as a storage including a memory; hardware such as a processor, a controller, an ALU (arithmetic logic unit), a digital signal processor, a microcomputer, an FPA (field programmable array), a PLU (programmable logic unit), and a microprocessor; and any devices that can execute software including a set of instructions and a combination thereof or instructions and can give responses.

The above description may be changed and modified by those skilled in the art without departing from the fundamental characteristics of the present disclosure. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the patent right of the present disclosure.

What is claimed is:

1. A method for providing a service for security of a web-browser-based content of a service providing system that distributes an HTML-based original content to a web browser of a user terminal, the service providing method comprising:

a character setting step of creating and storing one or more garbage character based on a plurality of original characters constituting an original content;

a content processing step of creating a security content obfuscating the original content by inserting one or more garbage characters, which are randomly selected from a plurality of pre-stored garbage characters, into the original content;

a security processing step of creating a security module that calls one or more functions for restoring the security content into the original content of APIs provided by a web browser, of creating, encoding, and inserting credential information, in which hash information and a function name for each of one or more callers included in a custom module are matched and included through the security module when creating the custom module including the one or more callers that call the API-based system function, in order to perform one or more functions related to the original content, and of inserting the security module and the custom module into the security content; and a distributing step of creating function recognition information for a caller that is not a caller defined in advance in the security module of callers that call the system function on the web browser by hooking an API of the web browser, and then of setting the security module into a distribution mode and then transmitting the security content to the web browser in order to operate the security module such that a caller corresponding to the function recognition information is allowed to call a system function when credential information coinciding with the function recognition information exists in the custom module.

2. The service providing method of claim 1, wherein a function that is called by the security module is included in a DOM property.

3. The service providing method of claim 1, wherein the security module and the custom module are modules created based on JavaScript.

4. The service providing method of claim 1, further comprising a step of creating hash information through a hash algorithm set in the security module for each of one or more callers included in the custom module by setting the security module into a development module in a process of creating the custom module, of creating credential information including the created hash information and a function name of each of one or more callers included in the custom module, and then of encoding and inserting the credential information into the custom module, wherein the distributing step further includes a step of setting a security module of a security content corresponding to a request information for the distribution request into the distribution mode rather than the development mode when receiving the request information from the web browser of the user terminal.

5. The service providing method of claim 1, wherein the security module set in the distribution mode is in accordance with execution of a security content of the web browser; recognizes a caller that calls a system function on the web browser; creates hash information by applying caller information including text information about a function of the recognized caller to a hash algorithm of the security module and then creates the function recognition information including a function name and hash information corresponding to the recognized caller when the recognized caller is not a caller defined in advance in a security module; decodes one or more items of credential information included in the custom module and then compares the credential information with the function recognition information based on a function name and hash information; prevents the recognized caller corresponding to the function recognition information from calling a system function when credential information coinciding with the function recognition information does not exist in the custom module; and allows the recognized caller to call a system function such that the called system function is executed when credential information coinciding with the function recognition information exists in the custom module.

6. The service providing method of claim 1, wherein the content processing step creates a plurality of unit characters by dividing a plurality of original characters included in the original content in the unit of word or the unit of character, sets an original security tag for each of the plurality of original unit characters, and creates a security content obfuscating the original content by inserting one or more garbage characters, which are randomly selected from a plurality of pre-stored garbage characters, and a garbage security tag for discrimination from the original security tag every between the plurality of original security tags.

7. The service providing method of claim 6, wherein the content processing step further includes a step of creating restoration information for recognize the original security tag and the garbage security tag, adding any one of the original security tag and the garbage security tag to the restoration information every time the any one is set, and putting the restoration information into the security content.

8. The service providing method of claim 7, wherein the content processing step further includes a step of encoding the restoration information using a preset encryption key and of putting the encoded restoration information into the security content.

9. The service providing method of claim 8, wherein one or more functions that are called by the security module decodes the restoration information using a preset decryption key, recognize the garbage security tag included in the security content based on the decoded restoration information, recognizes the garbage character on the basis of the garbage security tag recognized from the security content in accordance with the decoded restoration information, and converts a font size of the garbage character into 0.

10. The service providing method of claim 9, wherein the content processing step further includes a step of encoding and inserting security option information, which includes at least one of first option information allowing the original content only at a specific URL, a second option information about whether to activate a print function when opening the original content, third option information about whether to activate a click when opening the original content, fourth option information about whether to active a print screen function when opening the original content, and fifth option information about whether to insert watermarking when opening the original content, into the security content, wherein one or more functions that are called by the security module decodes the encoded security option information using the decryption key and then sets an environment property of the web browser on the basis of the security option information.

* * * * *